United States Patent [19]

Morisawa

[11] Patent Number: 4,537,095

[45] Date of Patent: Aug. 27, 1985

[54] HYDRAULIC CONTROL SYSTEM FOR AUTOMATIC TRANSMISSION

[75] Inventor: Kunio Morisawa, Toyota, Japan

[73] Assignee: Toyota Jidosha Kogyo Kabushiki Kaisha, Toyota, Japan

[21] Appl. No.: 464,859

[22] Filed: Feb. 8, 1983

Related U.S. Application Data

[63] Continuation of Ser. No. 160,575, Jun. 18, 1980, abandoned.

[30] Foreign Application Priority Data

Jun. 26, 1979 [JP] Japan .................................... 54-681

[51] Int. Cl.$^3$ ............................................ B60K 41/02
[52] U.S. Cl. ........................................ 74/868; 74/869; 74/752 C
[58] Field of Search ..................... 74/752 C, 867, 868, 74/869; 192/3.57, 87.15

[56] References Cited

U.S. PATENT DOCUMENTS

| | | | |
|---|---|---|---|
| 3,236,117 | 2/1966 | Christianson | 74/869 X |
| 3,405,575 | 10/1968 | Searles et al. | 74/868 |
| 3,640,157 | 2/1972 | Schaefer | 74/869 |
| 3,927,579 | 12/1975 | Golan | 74/868 X |
| 4,139,015 | 2/1979 | Sakai | 74/867 X |
| 4,145,937 | 3/1979 | Shindo et al. | 74/867 |
| 4,148,232 | 4/1979 | Moriya | 74/752 C X |

FOREIGN PATENT DOCUMENTS

177326 1/1954 Fed. Rep. of Germany ........ 74/868

*Primary Examiner*—Allan D. Herrmann
*Assistant Examiner*—Joseph M. Rolnicki
*Attorney, Agent, or Firm*—Finnegan, Henderson, Farabow, Garrett & Dunner

[57] ABSTRACT

A low coast shift (LCS) valve and a low coast shift control (LCC) valve are disposed coaxially with a shift valve, and a spring is disposed between the LCS valve and LCC valve. In the range in which engine braking occurs, the LCC valve is at first displaced by the line pressure toward the LCS valve. Displacement of the LCC valve is transmitted by way of the spring to the LCS valve and the shift valve. This displacement of the LCC valve is limited by a stopper, so that displacement of the LCS valve and the shift valve following the displacement of LCC valve are dependent on the relationship of the spring with the governor pressure. When displacement of the shift valve has reached a given distance, a port opens. Since the line pressure from the port is much higher than the governor pressure, the shift valve is instantaneously downshifted as soon as the aforesaid port has opened. In the range in which the engine braking occurs, line pressure is supplied to a detent regulator valve, so that the detent regulator valve is forcibly retained at an inoperative position, thereby preventing generation of a detent pressure.

13 Claims, 1 Drawing Figure

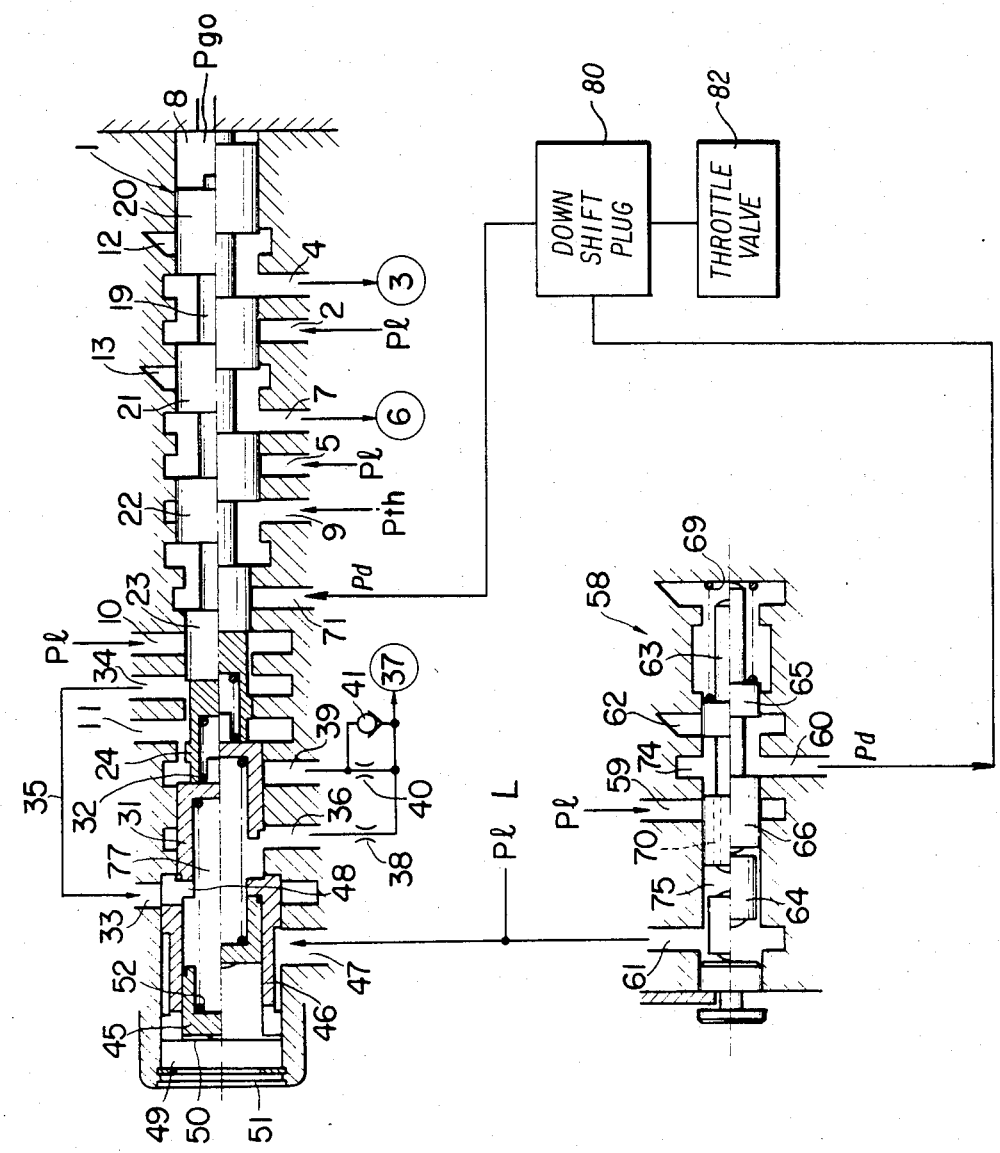

HYDRAULIC CONTROL SYSTEM FOR AUTOMATIC TRANSMISSION

This is a continuation of application Ser. No. 160,575, filed June 18, 1980, now abandoned.

BACKGROUND OF THE INVENTION

1. Field of the Invention

This invention relates to a hydraulic control system for an automatic transmission which is useful for operating during engine braking.

2. Description of the Prior Art

A line pressure P1 is generally adjusted so as to increase within a given range in association with an increase in the degree of opening of a throttle valve in a carburetor. At a high degree of the opening of throttle valve in the carburetor, a downshift point from the second speed drive position to the first speed drive position is shifted to a high speed side, thus causing the over run of an engine when it is desired to operate engine braking. In order to prevent the over run of the engine and to effect the downshift at a constant speed of a vehicle irrespective of a degree of an opening of the throttle valve, it has been customary to provide valves or the like in parallel to a 1-2 speed shift valve. This, however, results in an increased width of the valve body. Furthermore, where a spool is oscillated when the hydraulic pressure and the spring force are in equilibrium so as to adjust the pressure, foreign substances may get between the inner peripheral wall of the valve body and a land of the spool, thus leading to a seizure of such members.

SUMMARY OF THE INVENTION

It is accordingly an object of the present invention to provide a hydraulic control system for an automatic transmission which prevents the over run of an engine when engine braking is operated; and wherein the width of the valve body is reduced and seizure of the engaging member is eliminated.

To attain the object, there is provided according to the present invention, a hydraulic control system for an automatic transmission which comprises first, second and third valves which are disposed coaxially and are adapted to be axially displaced, the first and second valves being energized in one direction by the third valve on which a first pressure acts in a low range, the first and second valves operating so that hydraulic pressure is supplied to a friction engaging means for effecting engine braking as soon as the first pressure becomes as large as the governor pressure acting on the first valve in the other direction, the governor pressure being associated with the speed of the vehicle.

When the shift lever is shifted to a range in which engine braking operates, the third valve (a low coast shift control (LCC) valve) is displaced under hydraulic pressure of a given level toward the second valve (a low coast shift (LCS) valve). The displacement of the LCC valve is transmitted to the LCS valve and the first valve (a shift valve). The displacement of the LCC valve causes the LCS valve and the first valve (a shift valve) to be displaced against the governor pressure which acts on the shift valve. When displacement of the LCS valve and the shift valve have reached a given distance, the shift valve is downshifted so that the hydraulic pressure (line pressure) is supplied to the engaging means for effecting engine braking.

Since the LCC valve and the LCS valve are coaxial with the shift valve, there results a reduced width of the valve body. Both the LCS valve and the LCC valve are of a change-over valve type in which communication between ports is changed over from one to another, rather than a regulating valve type in which the reciprocating movement is repeated at a high frequency to adjust hydraulic pressure, thus avoiding seizure of frictional engaging means.

BRIEF DESCRIPTION OF THE DRAWING

The accompanying drawing shows the hydraulic control system of the present invention embodied in a 1-2 shift speed valve. In this connection, the gearing transmission of the automatic transmission and the entire hydraulic control system of U.S. Pat. No. 4,145,937, should be referred to for a better and full understanding thereof.

DESCRIPTION OF THE PREFERRED EMBODIMENTS

A 1-2 shift or first valve 1 is disposed, with its longitudinal axis being in parallel to the axis of the transmission, and includes a port 2 supplied with a line pressure P1 when the automatic transmission is shifted to the D-range or high speed ratio drive position; a port 4 connected to a brake 3 adapted to engage at the second and third speed drive positions; a port 5 supplied with a line pressure P1 at the 2-range or medium speed ratio drive position; a port 7 connected to a brake 6 adapted to engage for accomplishing engine braking at the second speed drive position; a chamber 8 supplied with a governor pressure Pgo increasing in relation to increase in the speed of the vehicle; a port 9 supplied with a throttle pressure Pth increasing in association with increase in opening of the throttle valve in the carburetor a second port 10 supplied with a line pressure P1 when the automatic transmission is shifted to the L(low) range or lowest speed ratio drive position; a sixth port 11 supplied with a line pressure P1 at the R(reverse) drive position, and serving as a drain at the other range drive positions; drains 12 and 13; a spool 19; and lands 20,21,22,23 and 24. The cross sectional areas of the lands 20,21 and 22 are larger than those of the lands 23 and 24.

When the governor pressure Pgo is relatively lower than throttle pressure Pth at the D-range drive position, spool 19 is displaced toward chamber 8, which is shown by the lower half of spool 19 as seen in the drawing, so that land 20 opens drain 12, whereupon port 4 is communicated with drain 12, and land 21 closes port 2. Thus, the hydraulic pressure at brake 3 is discharged so that the engine is maintained at the first speed drive position. When the governor pressure Pgo is relatively larger than the throttle pressure Pth, spool 19 is biased toward port 9 which receives throttle pressure Pth, which is shown by the upper position of spool 19 as seen in the drawing, so that land 20 closes drain 12, and the land 21 opens port 2 and closes drain 13, whereby the port 2 is communicated with the port 4. Thus, line pressure P1 is supplied to brake 3, whereby the engine is maintained at the second or third speed drive position.

At the 2-range drive position, line pressure P1 is supplied to port 5. When the vehicle is running at high speed, spool 19 assumes the upper position, as seen in the drawing and ports 5 and 7 communicate with each other so that line pressure P1 is supplied from the port 7 to the brake 6, whereby engine braking at the second speed position is established.

A low coast shift or second valve 31 (LCS) is disposed coaxially with and adjacent to the 1-2 shift or first valve 1. A spring 32 is confined between LCS valves 31 and the 1-2 shift valve 1. Fourth port 33 communicates by way of oil path 35 with third port 34, fifth port 36 is connected by way of an orifice 38 to the engaging-side hyraulic servo of brake 37 which is adapted to engage for achieving engine braking at the first speed position as well as for the reverse drive. Seventh port 39 is connected by way of a parallel circuit consisting of an orifice 40 and a check valve 41 to the engaging-side hydraulic servo of brake 37.

A low coast shift control or third valve 45 (LCC) is disposed coaxially with and adjacent to LCS valve 31. Sleeve 46 guides LCC valve 45 and prevents communication between the first port 47 and fourth port 33. Sleeve 46 is formed with a stopper 48 on the LCS valve side. Port 47 is adapted to be supplied with a line pressure P1 at the L-range drive position and communicates with chamber 50 between LCC valve 45 and a plug 49. Snap ring 51 is adjacent to plug 49. Spring 52 is confined between LCC valve 45 and LCS valve 31.

A detent regulator valve 58 includes; a port 59 supplied with a line pressure P1; a port 60 through which a detent pressure Pd is generated; a port 61 connected to the port 47; a drain 62; spools 63 and 64 coaxial with each other; lands 65 and 66 of the spool 63; a spring 69 acting on spool 63; and an axial oil path 70 passing through land 66. Port 60 is connected by way of a downshift plug 80 to port 71 in the 1-2 shift valve 1. Downshift plug 80 connects the port 60 in detent regulator valve 58 to port 71 in the 1-2 speed shift valve 1 when the accelerator pedal is kicked down and the degree of opening of the throttle valve 82 in the carburetor exceeds 85%.

When detent regulator valve 58 assumes the upper position as viewed in the drawing, line pressure P1 from port 59 is supplied to space 74 between lands 65 and 66, and then by way of the oil path 70 to space 75 between land 66 and spool 64. As a result, spool 63 is displaced to the right against the force of spring 69 to assume the lower position as viewed in the drawing, so that land 65 opens drain 62, and land 66 closes port 59. Consequently, hydraulic pressure in port 60 is decreased. Decrease in hydraulic pressure in port 60 leads to decrease in hydraulic pressure in space 75. Thus, spool 63 is displaced to the left under the force of spring 69 to assume the upper position in the drawing, and land 66 opens port 59 to some extent, thereby allowing communication between ports 59 and 60. By the repetitive reciprocating movement of spool 63, detent pressure Pd of a given level is generated in port 60.

In operation, the shift lever is moved to the L-range drive position, line pressure P1 (P1 > p) will be supplied from a manual valve (not shown) to port 10 in the 1-2 shift valve 1, port 47 in the LCC valve 45, and port 61 in the detent regulator valve 58, respectively. The line pressure P1 supplied to port 61 will act on spool 64 to urge it to the right, along with spool 63. The detent regulator valve 58 thus assumes the lower position in the drawing, so that port 59 is closed by land 66 and port 60 is connected to drain 62. Generation of the detent pressure Pd in port 60 is thus prevented. Although the downshift plug 80 connects port 60 to the 1-2 shift valve 1 and the 2-3 shift valve (not shown) when the degree of opening of the throttle valve 82 in the carburetor becomes higher than 85%, there is no likelihood in the L-range drive position that the detent pressure Pd is supplied to port 71 in the 1-2 shift valve 1, irrespective of the degree of opening of the throttle valve 82 in the carburetor. On the other hand, the 1-2 shift valve 1 assumes the upper position shown in the drawing prior to operation of the shift lever, and port 10 is closed by land 23. The line pressure P1 supplied from port 47 to chamber 50 acts on the LCC valve 45 to displace it to the right. Displacement to the right of the LCC valve 45 is limited by stopper 48. Although the line pressure P1 is adjusted so as to increase by a given level with increase in a degree of opening of the throttle valve in the carburetor, the LCS valve 31 is displaced to the right due to a given load from spring 52, independently of the level of the line pressure P1. Since the LCS valve 31 and spool 19 abut with each other, spool 19 is displaced to the right integrally with the LCS valve 31 and when displacement of spool 19 reaches a given value, the land 23 opens the port 10, so that the ports 10 and 34 will be in communication with each other. Consequently, the line pressure P1 will be supplied by way of port 34 and oil path 35 to port 33, and the line pressure P1 from port 33 exerts a rightward force on the LCS valve 31. When the line pressure P1 is sufficiently higher than governor pressure Pgo in chamber 8, the strong line pressure P1 is added to the rightward force which acts on spool 19 from this time on, such that spool 19 is instantaneously displaced to the lower position as shown in the drawing. After the line pressure P1 has been supplied to port 33, since each side of the LCC valve 45 is maintained at line pressure P1, the LCC valve 45 is retained in contact with the stopper 48 from this time on. Since, at the positions other than the R-range drive, port 11 serves as a drain, the oil in space 77 between the LCC valve 45 and the LCS valve 31 is smoothly discharged therefrom through the port 11, although space 77 varies in volume due to displacement to the right of the LCC valve 45. When the LCS valve 31 and spool 19 assume the lower position as shown in the drawing, land 24 interrupts communication between ports 34 and 11, and in turn, ports 36 and 33 communicate with each other, whereby line pressure P1 is supplied by way of orifice 38 to brake 37, thereby accomplishing engine braking at first speed drive position.

In the R-range drive position, the line pressure P1 is introduced from the manual valve to port 11. Thus, spool 19 is displaced to the lower position as shown in the drawing, so that land 24 interrupts communication between ports 11 and 34. The LCS valve 31 in turn is biased to the upper position as shown in the drawing, thereby allowing port 11 to communicate with port 39. The line pressure P1 is thus supplied by way of orifice 40 to brake 37, thus bringing brake 37 for the reverse drive into engagement.

In the D-range drive position, no line pressure is introduced into the port 47, and the LCC valve 45 assumes the upper position as shown in the drawing. At this time, the spring load of spring 52 becomes nill, and the LCS valve 31 is retained by the force of the spring 32 in a position in which it is in contact with stopper 48. Port 39 becomes connected to port 11 serving as a drain in the D-range drive position. Thus, brake 37 is connected by way of port 11 to the drain and maintained in a disengaged state. The hydraulic pressure from brake 37 is rapidly discharged by way of check valve 41. Check valve 41 acts in common for orifices 38 and 40.

What is claimed is:

1. A hydraulic control system for an automatic transmission of an engine driven vehicle, the automatic transmission having at least drive and low speed ranges and reverse drive and the engine having a throttle, the control system comprising:

first, second and third coaxial valves, said valves being axially displaceable in opposite first and second directions, said second valve axially abutting said first valve and axially spaced from said third valve;

stop means for limiting axial movement of said third valve in said first direction;

means for introducing governor fluid pressure to bias said first valve in said second direction, said governor fluid pressure being directly related to the speed of said vehicle;

first port means for introducing line pressure to bias said third valve in said first direction to said stop means;

friction engaging means for permitting engine braking of said vehicle;

second port means for selectively conducting line pressure to actuate said friction engaging means when said low speed range is selected, said second port means including means for applying line pressure to bias said second valve in said first direction;

first spring means interconnecting said second and third valves for opening said second port means to accuate said friction engaging means with line pressure when force in said first direction caused by said first spring means exceeds governor pressure biasing said first valve in said second direction and for positively moving said first and second valves to their limit in said first direction; and means responsive to said throttle for supplying a detent pressure of a predetermined level to act on said first valve in a direction opposite to said governor pressure when said throttle means exceeds a predetermined level and for preventing application of said detent pressure to said first valve when engine braking is effective, said detent pressure supply means comprising a regulator valve including:

a first input port receiving said line pressure;

an output port generating said detent pressure;

a first spool having first and second lands defining a first chamber in continuous communication with said output port and with a second chamber by means of an oil path through said first land;

a drain port;

a spring acting on said second land in substantially equal opposition to fluid pressure in said first chamber for oscillating said first spool to alternatively connect said first input port and said drain port with said first chamber to generate the predetermined level of detent pressure;

a second spool coaxial with said first spool and disposed in said second chamber; and a second input port communicating with said second chamber and receiving said line pressure when said low speed range is selected for forcing said first and second spools against said spring to prevent generation of detent pressure at said outlet port.

2. The hydraulic system of claim 1 further comprising third port means for selectively conducting line pressure to said friction engaging means when said reverse drive is selected.

3. The hydraulic system of claim 2 further comprising second spring means interconnecting said first and second valves for biasing said second valve in said second direction to said stop means when line pressure at said first port means is substantially zero and for connecting said friction engaging means to a drain for disengagement when said drive speed range is selected.

4. The hydraulic control system as in claim 3 wherein said first port means comprises a first port for receiving said line pressure and wherein said second port means comprises a second port for receiving said line pressure when said low speed range is selected, third and fourth ports responsive to movement of said first valve providing fluid communication between said second port and a variable chamber defined by said second and third valves and a fifth port responsive to movement of said second valve providing fluid communication between said variable chamber and said friction engaging means.

5. The hydraulic control system as in claim 4 wherein said first valve includes a reduced diameter portion proximate said second valve defining a peripheral chamber and wherein said third port means comprises a sixth port constituting a drain when drive and low speed ranges are selected and receiving line pressure when reverse drive is selected, said sixth port communicating with said peripheral chamber, and a seventh port providing communication between said peripheral chamber and said friction engaging means.

6. The hydraulic control system as in claim 5, wherein the reduced diameter portion of said first valve has a land for controlling fluid communication between said third port and said sixth port acting as a drain, said land interrupting fluid communication between said third and sixth ports whenever said second and third ports are in fluid communication.

7. The hydraulic control system as in claim 6 wherein said fifth port is connected by way of an orifice to said friction engaging means.

8. The hydraulic control system as in claim 7 wherein a sleeve is provided so as to guide said third valve and wherein said stop means comprises an annular shoulder formed on said sleeve proximate said second valve.

9. The hydraulic control system as in claim 8 wherein an orifice and a check valve connected in parallel relation to each other are provided between said seventh port and said friction engaging means.

10. A hydraulic control system for an automatic transmission of an engine driven vehicle, the automatic transmission having at least drive and low speed ranges and reverse drive and the engine having a throttle, the control system comprising:

first, second and third coaxial valves, said valves being axially displacable in opposite first and second directions, said second valve axially abutting said first valve and axially spaced from said third valve;

stop means for limiting axial movement of said third valve in said first direction;

means for introducing governor fluid pressure to bias said first valve in said second direction, said governor fluid pressure being directly related to the speed of said vehicle;

first port means for introducing line pressure to bias said third valve in said first direction to said stop means; friction engaging means for permitting engine braking of said vehicle;

second port means for selectively conducting line pressure to actuate said friction engaging means when said low speed range is selected, said second port means including means for applying line pressure to bias said second valve in said first direction;

first spring means interconnecting said second and third valves for opening said second port means to accuate said friction engaging means with line pressure when force in said first direction caused by said first spring means exceeds governor pressure biasing said first valve in said second direction and for positively moving said first and second valves to their limit in said first direction;

third port means for selectively conducting line pressure to said friction engaging means when said reverse drive is selected; and second spring means interconnecting said first and second valves for biasing said second valve in said second direction to said stop means when line pressure at said first port means is substantially zero and for connecting said friction engaging means to a drain for disengagement when said drive speed range is selected.

11. The hydraulic system of claim 10 wherein said engine includes throttle means and further comprising means responsive to said throttle means for supplying a detent pressure of a predetermined level to act on said first valve in a direction opposite to said governor pressure when said throttle means exceeds a predetermined level and for preventing application of said detent pressure to said first valve when engine braking is effective.

12. The hydraulic control system as in claim 11 wherein said detent pressure supply means comprises a regulator valve including a first input port receiving said line pressure, an output port generating said detent pressure, a first spool having first and second lands defining a first chamber in continuous communitation with said output port and with a second chamber by means of an oil path through said first land, a drain port, and a spring acting on said second land in substantially equal opposition to fluid pressure in said first chamber for oscillating said first spool to alternatively connect said first input port and said drain port with said first chamber to generate the predetermined level of detent pressure.

13. The hydraulic control system as in claim 12 wherein said regulator valve further includes a second spool coaxial with said first spool and disposed in said second chamber and a second input port communicating with said second chamber and receiving said line pressure when said low speed range is selected for forcing said first and second spools against said spring to prevent generation of detent pressure at said outlet port.

* * * * *